Patented Feb. 10, 1948

2,435,905

UNITED STATES PATENT OFFICE 2,435,905

SOLUBLE BASIC DYES

Arthur E. Schaefer, Loudonville, N. Y., assignor to General Aniline & Film Corporation, New York, N. Y., a corporation of Delaware No Drawing. Application January 3, 1946, Serial No. 638,907

8 Claims. (Cl. 260—388)

This invention relates to basic dyestuffs which are readily soluble in both water and alcohol and is particularly directed to the production of glycerol phosphoric acid salts of basic dyes.

It is known that many basic dyestuffs which are most generally isolated as the hydrochloride of the base have only a limited solubility in water so that they are unsuitable for use in many applications, particularly in the "beater dyeing" of paper. This limited solubility of certain dyestuffs of this character has been overcome by employing the salt of the dyestuff base with acids other than hydrochloric and sulfuric acid. Thus, United States Patent No. 1,978,755 to Muller et al. discloses the production of the phosphoric acid dyestuffs of basic dyes. While the solubility of basic triaryl methane dyes is improved by employing the phosphoric acid salt of the base in place of the hydrochloride thereof, these phosphoric acid salts, as well as other salts which have been suggested, have the disadvantage of being poorly soluble in ethyl alcohol and, therefore, are unsuitable for use in the lake trade wherein high solubility in alcohol is important. It is therefore apparent that from a commercial standpoint, a triaryl methane dyestuff which would possess good solubility in both water and alcohol is highly desirable.

I have discovered that if basic dyestuffs, such as basic triaryl methane dyes, are isolated as the glycerol phosphoric acid salt, they possess good solubility in water, being superior in this respect to the hydrochloric acid salts, and are thus satisfactory for use in beater dyeings of paper and, at the same time, have a good solubility in alcohol, being equal in this respect to the hydrochloric acid salts and vastly superior to many other salts which may possess as good solubility in water as do the dyestuffs of the present invention.

The glycerol phosphoric acid salts of basic triaryl methane dyestuffs and other basic dyes such as basic azine, oxazine, thiazine, azo-azine, acridine, or diphenyl methane dyes, may readily be produced by adding to a paste of a triaryl methane dye base or other dye base a sufficient quantity of glycerol phosphoric acid to convert the base into the glycerol phosphoric acid salt, temperatures up to 100° C. being employed if necessary to complete the reaction. The thus-obtained glycerol phosphoric acid salt of the dyestuff may then be recovered by filtration and drying in the usual manner. The glycerol phosphoric acid employed may be a mixture of alpha and beta glycerol phosphates, obtained by the interaction of glycerol and phosphoric acid, anhydride or salts.

The following specific examples fully illustrate the present invention; the parts are by weight:

Example 1

One hundred parts of Victoria Blue BA (Color Index 729) Base Paste, containing about 86% water, was charged into a suitable reaction vessel. A sufficient amount of glycerol phosphoric acid was added (about 23 parts of a commercially available grade) so that after agitation for 30–45 minutes at room temperature, the base was completely converted into the glycerol phosphoric acid salt. This conversion is complete when 2 grams of the paste, when dissolved in 100 ccs. of water, has a pH of 2.8 to 3.1. The stirring may be continued until a smooth paste is obtained and the glycerol phosphoric acid salt of the dyestuff then recovered by filtration and drying in the usual manner. The dye obtained has excellent solubility in water and ethanol.

The glycerol phosphoric acid salt of Victoria Blue BA Base was found to be satisfactory as a dyestuff for paper. 150 grams of ground wood 10% dry (=15 grams dry) and 150 grams of unbleached sulfite 10% dry (=15 grams dry) were placed in an enamel cup of about 1500 cc. capacity. There was then added 0.1 grams of dry color, the glycerol phosphate of Victoria Blue BA, and the mixture then diluted with 1000 cc. of water at 60° F. The gear stirrers were then started and after they had run for 20 minutes, there was then added 2% dry weight of rosin size (=50 cc. of a rosin size emulsion containing per liter, 17 grams of rosin paste of 70% solids). After running for 1 minute, there is then added 2½% alum (=50 cc. of a solution containing 15 grams alum per liter). The stirrers were then run for 10 minutes, after which hand samples were made and dried. The coloring matter dissolved readily and left no color specks in the finished sample.

In a similar manner, other basic triaryl methane dyestuffs may be isolated as their glycerol phosphoric acid salts. As examples of other dyestuffs of this type which may be treated in the same manner as the Victoria Blue BA Base in the preceding example in order to obtain their corresponding glycerol phosphoric acid salts which have good solubility in both water and ethanol may be mentioned Victoria Blue R Base (Color Index No. 728), Methyl Violet or Methyl Violet XX Base (Color Index No. 680), Crystal Violet APX Base (Color Index No. 681), Malachite Green Base (Color Index No. 657), Brilliant Green Base (Color Index No. 662), Rosaniline Base (Color Index No. 677), Rhoduline Blue 6GA (Color Index No. 658), Basic diaryl methane dyestuffs, for example, Auramine DO (Color Index No. 655), may also be isolated in a similar manner as their glycerol phosphoric acid salts which have good solubility in both water and ethanol.

*Example 2*

Using the procedure described in Example 1, a basic azo dye, Chrysodine RS Base (Color Index No. 21) was treated with an equivalent amount of glycerol phosphoric acid while agitating until the dyestuff had been converted into the glycerol phosphoric acid salt which was found to have good solubility in water and ethanol.

*Example 3*

Using the procedure described in Example 1, a basic azoazine dye, Diazine Black Base (Color Index No. 134), was treated with an equivalent amount of glycerol phosphoric acid while agitating until the dyestuff had been converted into the glycerol phosphoric acid salt which was found to have good solubility in water and ethanol.

In the same manner, other basic azo-azine dyestuffs or basic azine dyestuffs, such as Safranine (Color Index No. 841), Methylene Violet 3RA (Color Index No. 842) and Rhoduline Violet (Color Index No. 844) may be converted into their glycerol phosphoric acid salts which have good solubility in water and ethanol.

Likewise, the glycerol phosphoric acid salts of basic Oxazine dyestuffs, such as Brilliant Blue C (Color Index No. 877), Gallo Violet D (Color Index No. 881) and Gallo Navy Blue S (Color Index No. 884) or of basic Thiazine dyestuffs, such as Thionine (Color Index No. 920) or Leucogallothionine (Color Index No. 929) may be obtained.

*Example 4*

Using the procedure outlined in Example 1, a basic acridine dyestuff, Euchrysine 2G Base (Color Index No. 797) was treated with an equivalent amount of glycerol phosphoric acid while agitating until the dyestuff had been converted into the glycerol phosphoric acid salt which had good solubility in water and ethanol.

I claim:

1. Glycerol phosphoric acid salts of basic dyes selected from the group consisting of basic diaryl methane, triaryl methane, azine, oxazine, thiazine, azo-azine, azo and acridine dyes, said salts being easily soluble in water and ethanol.

2. Glycerol phosphoric acid salts of basic triaryl methane dyes, said salts being easily soluble in water and ethanol.

3. Glycerol phosphoric acid salts of basic triaryl methane dyes of the general formula:

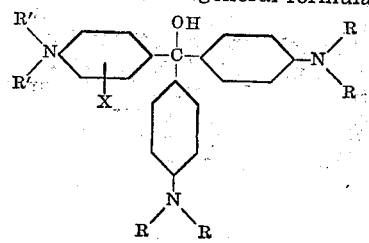

in which R stands for a member of the group consisting of hydrogen and alkyl groups and R' stands for a member of the group consisting of hydrogen, alkyl and aryl groups and X stands for a member of the group consisting of hydrogen, halogen and methyl, said salts being easily soluble in water and ethanol.

4. Glycerol phosphoric acid salts of basic triaryl methane dyes of the general formula:

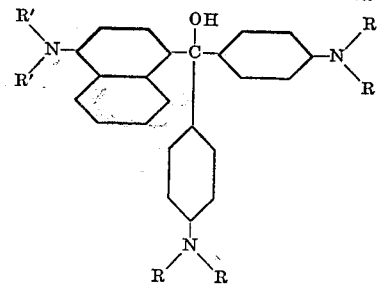

in which R stands for a member of the group consisting of hydrogen and alkyl, and R' stands for a member of the group consisting of hydrogen and alkyl and aryl groups; said salts being easily soluble in water and ethanol.

5. Glycerol phosphoric acid salts of the basic dye of the triaryl methane series corresponding to the formula:

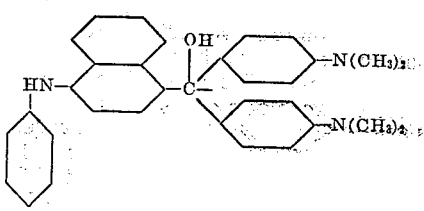

6. Glycerol phosphoric acid salts of the basic dye of the triaryl methane series corresponding to the formula:

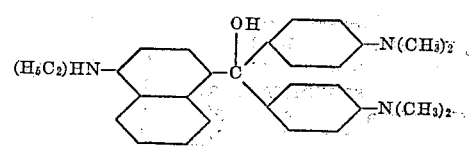

7. Glycerol phosphoric acid salts of the basic dye of the triaryl methane series corresponding to the formula:

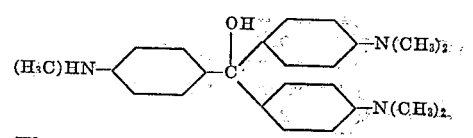

8. The process for manufacturing easily soluble salts of basic dyes of the triaryl methane series which comprises binding the basic constituent of the dye with glycerol phosphoric acid.

ARTHUR E. SCHAEFER.

REFERENCES CITED

The following references are of record in the file of this patent:

UNITED STATES PATENTS

| Number | Name | Date |
|---|---|---|
| 1,841,876 | Buc | Jan. 19, 1932 |
| 1,978,755 | Muller et al. | Oct. 30, 1934 |